No. 749,146. PATENTED JAN. 12, 1904.
F. L. AVERILL.
SULKY PLOW.
APPLICATION FILED MAR. 22, 1901.
NO MODEL. 2 SHEETS—SHEET 2.
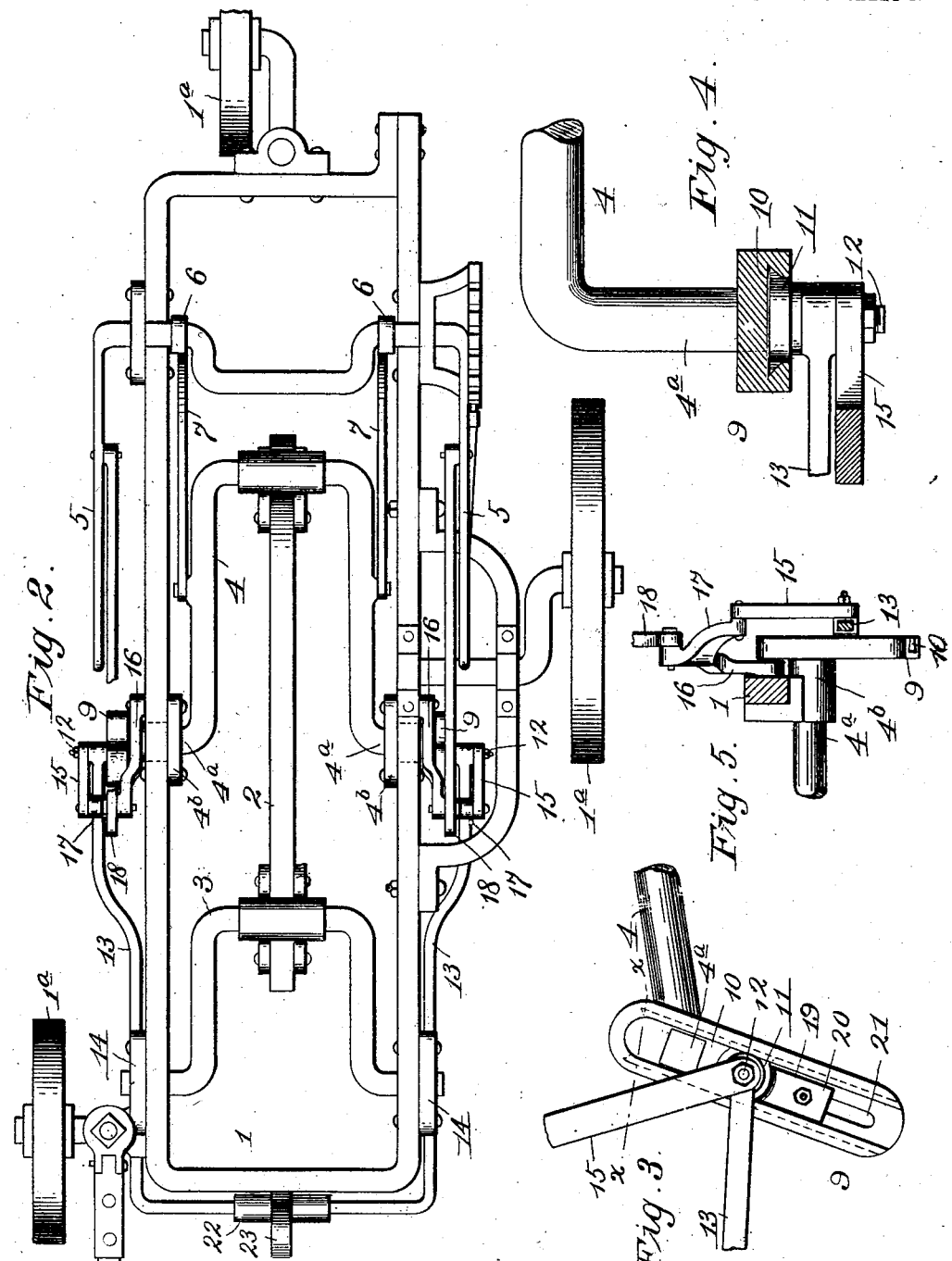
Witnesses:
W. W. Ingle.
P. A. Hickey.
Inventor:
Frank L. Averill
By F. G. Fischer
Atty.

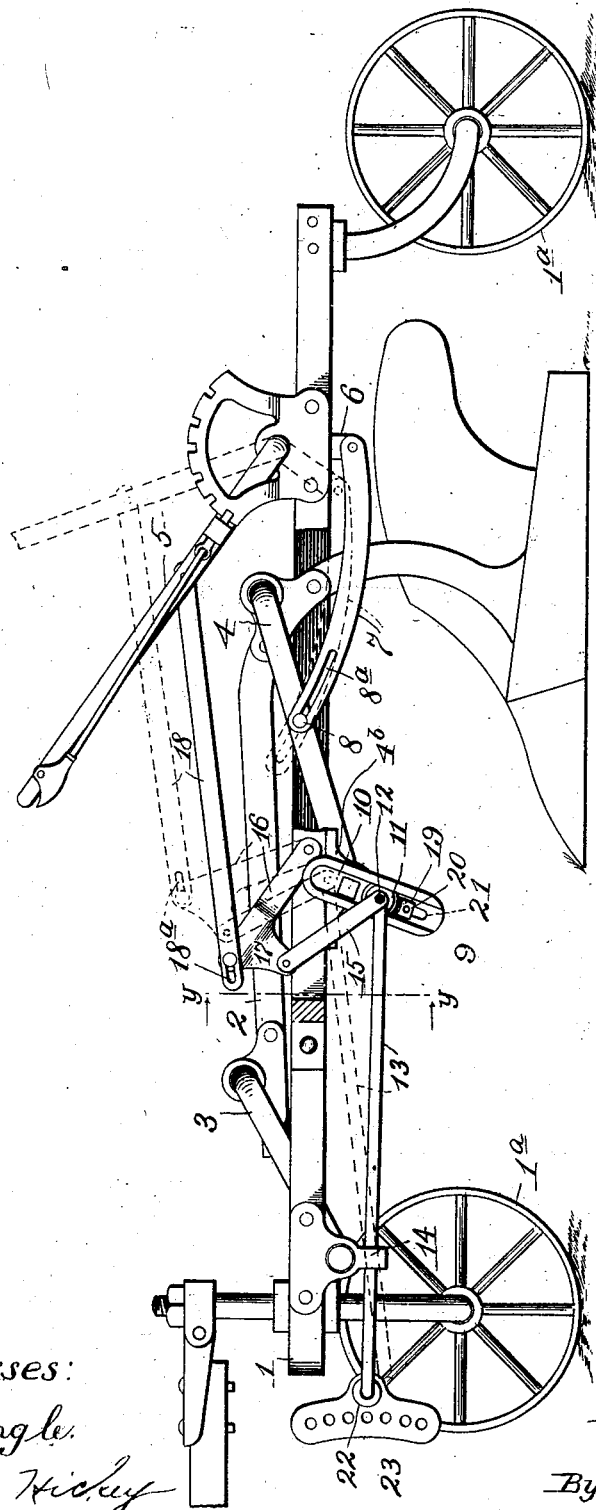

No. 749,146. Patented January 12, 1904.

UNITED STATES PATENT OFFICE.

FRANK L. AVERILL, OF KANSAS CITY, KANSAS.

SULKY-PLOW.

SPECIFICATION forming part of Letters Patent No. 749,146, dated January 12, 1904.

Application filed March 22, 1901. Serial No. 52,372. (No model.)

*To all whom it may concern:*

Be it known that I, FRANK L. AVERILL, a citizen of the United States, residing at Kansas City, in the county of Wyandotte, in the State of Kansas, have invented certain new and useful Improvements in Sulky-Plows, of which the following is a full, clear, and exact description, reference being had to the accompanying drawings, which form a part of this specification.

My invention relates to improvements in sulky-plows, having more particular reference to an attachment by which the team pulling the plow is given a leverage to draw and hold the plow in the ground and by means of which as the plow is raised out of the ground the line of draft is shifted so the team will assist in lifting the plow; and to accomplish this my invention consists of certain features of novelty hereinafter described, and pointed out in the claims.

Figure 1 represents a side elevation of my improvements applied to a three-wheeled sulky-plow with parts of the latter omitted. Fig. 2 represents a plan view of the same. Fig. 3 represents a detail view of the draft-crank constituting the leading feature of my invention. Fig. 4 represents a cross-section of the same on the line $xx$ of Fig. 3. Fig. 5 represents a front elevation of the draft-crank and its immediate connections with the frame in section, taken on the line $yy$ of Fig. 1.

1 represents the frame, mounted on carrying-wheels $1^a$, and 2 represents the beam of a sulky-plow.

3 represents the front bail, and 4 the rear bail, by which the plow-beam is connected with or hung upon the frame.

5 represents a rocking lever mounted upon the rear of the frame, provided with the depending arms 6, to which are connected the lifting-bars 7, connected with the rear bail 4 at 8, the pin 8 of the bail working in a slot $8^a$ in said bar. The forward ends $4^a$ of the rear bail are bent outwardly at right angles thereto and are pivotally mounted in depending brackets $4^b$, rigidly secured to the opposite sides of frame 1. Ends $4^b$ extend outwardly a suitable distance from the brackets and are provided with rigidly-secured draft-cranks 9, formed each with a groove 10, in which a draft-block 11 is arranged to slide longitudinally. Said draft-block is provided with a threaded stud 12, upon which is mounted the draft-bail 13, which extends around a short distance in front of and below the forward end of the frame and is supported in depending eyes formed in the hangers 14 of the front beam-bail. The draft-block is operated to shift the draft by a bar 15, pivotally secured at its opposite ends to stud 12 and the end of an arm 17, a bar 16, pivotally secured at its lower end to frame 1 and to which arm 17 is integrally formed, and a connecting-bar 18, pivotally secured at its opposite ends to the upper end of bar 17 and the handle-bar of the rocking lever. The sliding movement of the draft-block in groove 10 of the draft-crank is limited by the upper closed end of said draft-crank and a stop-block 19, adjustably secured in position by a bolt 20, extending through a longitudinal slot 21 in the draft-crank. The forward part of draft-bail 13 is reinforced by a section of pipe 22, upon which is secured a clevis-block 23.

In operation the share is lowered into the ground by throwing rocking lever 5 forward, which movement lowers draft-blocks 11, so that the line of draft through draft-bail 13 will be below the pivotal points of bail 4, as shown in Fig. 1. Then as the team draws the plow forward the strain on the lower portion of draft-cranks 9 will depress the rear portion of bail 4, causing the latter to turn in brackets $4^b$, so it will force and hold the share in the soil to a depth regulated by adjusting the draft-blocks closer to or farther from the points of attachment of the draft-cranks to the bail, the desired adjustment being obtained by manipulating the rocking lever. The share can be raised out of the ground by drawing the rocking lever backward until the draft-blocks have been elevated to the position shown by dotted lines in Fig. 1, which operation is performed with ease, as the slots $18^a$ in connecting-bars 18 permit the initial movement of the rocking lever, and slots $8^a$ permit the forward movement of the lifting-bars a suitable distance without elevating bail 4. Then as the team continues its forward movement the strain brought to bear upon the upper ends of the draft-cranks will elevate the rear portion of bail 4, causing the latter to turn in brackets $4^b$ until the share is raised above the surface of the ground.

Having thus described my improvements, what I claim as my invention, and desire to secure by Letters Patent, is—

1. In a sulky-plow having a suitable beam and frame, and a bail connecting the beam with the frame, cranks rigidly connected with said bail, forming therewith a lever having its fulcrum on the frame, a draft-bail having a sliding connection with said cranks, and means for sliding said draft-bail on said crank to shift the draft above or below the fulcrum, substantially as set forth.

2. In a sulky-plow having its beam connected with the frame by bails, cranks rigidly mounted on one of said bails, draft-blocks arranged to slide on said cranks, a draft-bail connected with said blocks, and means for shifting said draft-blocks, substantially as set forth.

3. In a sulky-plow the combination with the beam and frame, bails connecting the beam with the frame and a rocking lever connected with one of said bails, of cranks rigidly mounted on said bail, draft-blocks arranged to slide on said cranks, a draft-bail connected with said draft-blocks, and means connected with the handle-bar of said rocking lever for shifting said draft-blocks, substantially as set forth.

4. In a sulky-plow having its beam connected with the frame by bails, and provided with a rocking lever connected with one of said bails for controlling the plow, the combination with a crank rigidly mounted on said bail, a draft-block arranged to slide on said crank, and a draft-bail connected with said block, of a bar pivotally mounted on said block, a bar pivotally mounted on the frame, having an arm pivotally connected with said block-bar, and a bar pivotally connected with said frame-bar and with the handle-bar of said rocking lever, substantially as set forth.

5. In a sulky-plow having a suitable beam and frame, a bail mounted on the beam, cranks rigidly connected with said bail forming therewith a lever having its fulcrum on the frame, draft-blocks arranged to slide on said cranks, and blocks adjustably mounted on said cranks to determine the position of said draft-blocks, substantially as set forth.

6. The combination with the frame, the beam connected with the frame by bails and the lifting mechanism of a sulky-plow, of cranks rigidly connected with one of the bails and forming therewith a lever having its fulcrum on the frame, draft-blocks arranged to slide on said cranks, a draft-bail connected with said blocks, and means connected with the lifting mechanism for moving said blocks above or below the fulcrum, substantially as set forth.

FRANK L. AVERILL.

Witnesses:
O. A. LUCAS,
J. S. SCHULTZ.